United States Patent
Carrillo Rodriguez

(10) Patent No.: US 7,214,024 B2
(45) Date of Patent: May 8, 2007

(54) PUSH BACK PALLET STORAGE SYSTEM

(75) Inventor: Jose Luis Carrillo Rodriguez, Cornella de Llobregat (ES)

(73) Assignee: Mecalux, S.A., Cornella de Llobregat (Barcelona) (ES)

( * ) Notice: Subject to any disclaimer, the term of this patent is extended or adjusted under 35 U.S.C. 154(b) by 101 days.

(21) Appl. No.: 11/048,940

(22) Filed: Feb. 2, 2005

(65) Prior Publication Data
US 2006/0171796 A1    Aug. 3, 2006

(51) Int. Cl.
*A45F 5/00* (2006.01)
(52) U.S. Cl. .................... 414/286; 211/151
(58) Field of Classification Search ............... 414/276, 414/286; 211/151, 59.2, 162
See application file for complete search history.

(56) References Cited
U.S. PATENT DOCUMENTS

| | | | | |
|---|---|---|---|---|
| 4,715,765 A | * | 12/1987 | Agnoff | 414/276 |
| 4,773,546 A | * | 9/1988 | Konstant | 211/151 |
| 4,779,999 A | * | 10/1988 | Lautenschlager | 384/18 |
| 5,137,159 A | * | 8/1992 | Collins et al. | 211/151 |
| 5,178,288 A | * | 1/1993 | Werner et al. | 211/151 |
| 5,312,004 A | | 5/1994 | Krummel et al. | |
| 5,419,444 A | * | 5/1995 | Strom | 211/151 |

* cited by examiner

*Primary Examiner*—Charles A. Fox
(74) *Attorney, Agent, or Firm*—Michael J. Striker

(57) ABSTRACT

A push back pallet storage system has a plurality of side members and cross members arranged in several levels, a plurality of carriages for feeding pallets in depth and movable lengthways relative to longitudinal beams fixed to the members, the movable carriages being formed as a substantially reversed U-shaped section member provided with wings with inwardly located rotatable bearings, the section member being configured to surround the longitudinal beams outwardly so that the bearings run inwardly along a lower portion of a web of the beams.

6 Claims, 6 Drawing Sheets

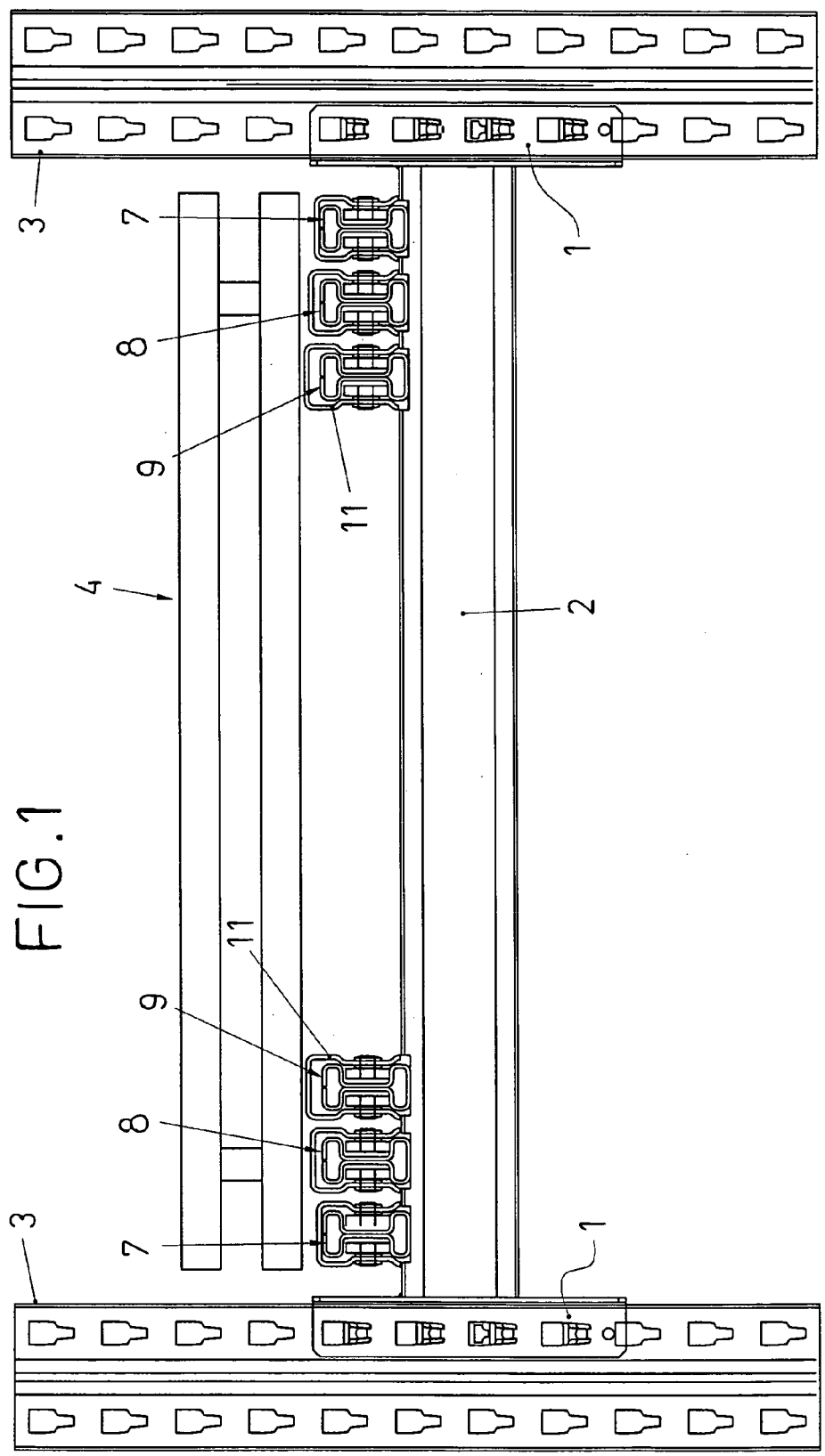

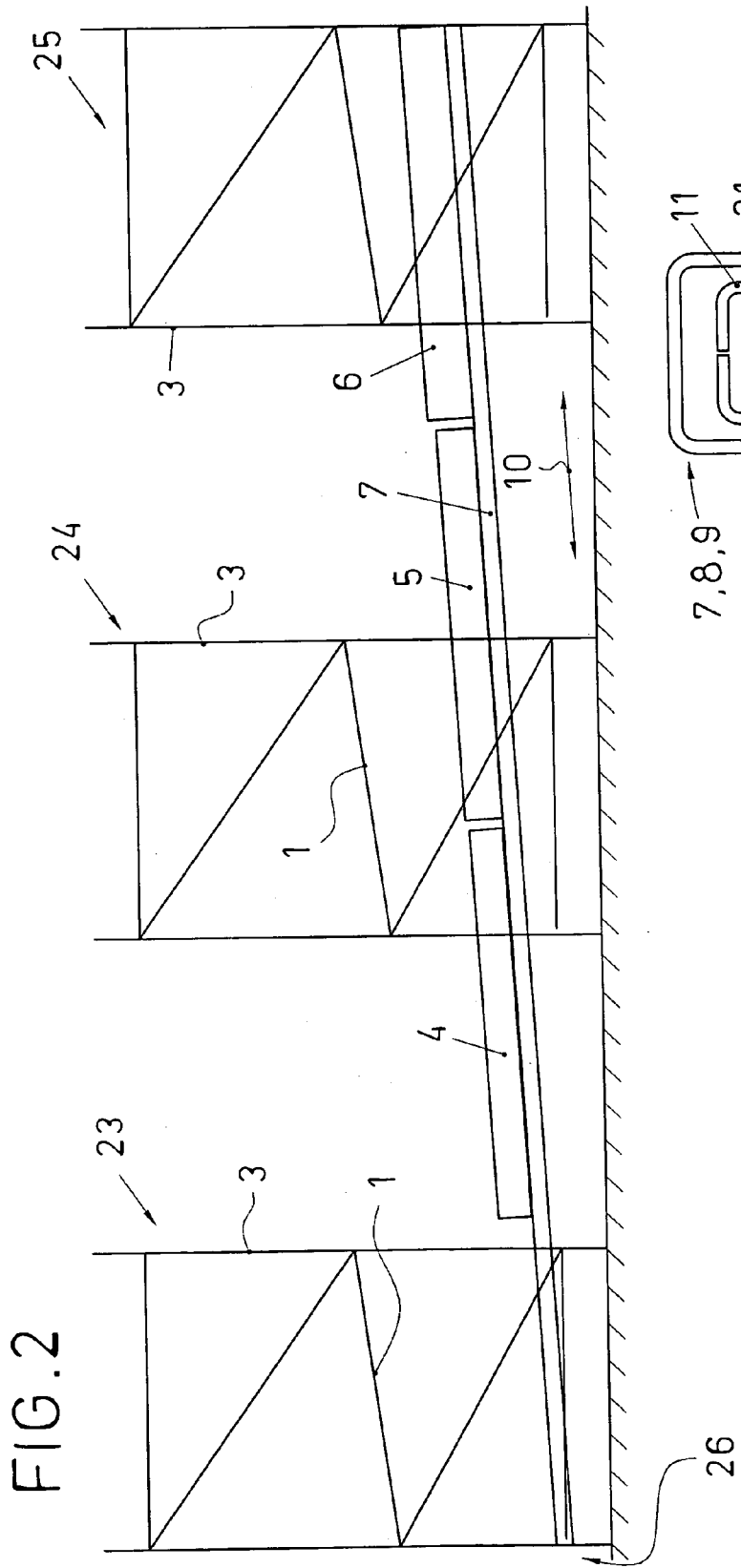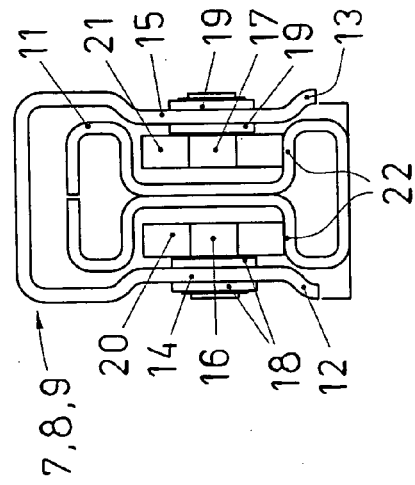

PUSH BACK PALLET STORAGE SYSTEM

BACKGROUND OF THE INVENTION

The present invention relates generally to push back pallet storage systems.

More particularly, the invention refers to an improvement in depth pallet storage systems referred to as push back that allow a fast operation speed and high storage density. In these storage systems, pallets are stored placed on a slightly inclined plane so that the last one was introduced is the first one that is extracted. Several levels may be arranged in height with which a simple selectivity of the stock is obtained in contrast with block stacking conventional procedures.

In conventional push back systems, a forklift truck places the pallet loads in the system on a platform that may be moved lengthwise so that each platform is pushed back by the next loaded pallet. For unloading, each platform slips forward in the rack as the previous pallet is extracted with the help of the slightly inclined plane on which the platforms are arranged. Loading and unloading of the pallets is carried out through a central passageway wherein the forklift truck moves.

The movable platforms in the conventional push back system basically comprise a metallic frame provided with wheels or rollers. One of these structures is described in the U.S. Pat. No. 5,312,004 which refers to a slidable platform for a push back system. The platform comprises two rails acting as a guide for rollers fitted in frames running above the rails.

Although this structure is effective, it suffers from several disadvantages such as a great constructive complexity causing, among other things, that the necessary inclination for unloading the pallets by gravity must be high.

SUMMARY OF THE INVENTION

Accordingly, it is an object of the present invention to provide a pallet storage system which eliminates the disadvantages of the prior art.

More particularly, it is an object of the present invention to provide an alternative to this type of pallet storage systems through which it is possible to overcome the above disadvantages further providing many advantages regarding them, as it will be detailed hereinafter.

The invention provides an improved structure for push back pallet storage systems that comprises a set of side members and cross members which load is held vertically by upright props. The side members and cross members are arranged in several levels so that pallets may be fed lengthwise in depth into the formed structure onto carriages which may be moved relative to corresponding longitudinal beams fixed to the structure.

This structure has the feature that the rails are formed by an open, substantially reversed U-shaped section member. Respective bearings are rotatably fitted at the lower portion of the wings of the section member. It should be kept especially in mind the fact that the bearings are fitted on aligned shafts housed into shaped portions projecting inwardly of each wing of the U-shaped section member of the rails so that the bearings do not project from the entire width of the section. This advantageously allows reducing the distance between the rails.

The open cross section of the movable carriages is properly adapted to be arranged for surrounding the longitudinal beams. These longitudinal beams have a substantially I-shaped cross section, so that the bearings run through the inside of the web of the beams.

With a structure such as that herein described a very reliable and effective pallet storage means is achieved by means of the so called push back systems. The fact of providing movable carriages obtained from a section member having a configuration "embracing" the beam involves an assurance that the rail will not work their way out of its path during the forklift truck operation. Furthermore, since two rollers are provided for each rail, guiding is more accurate as there is less freedom of lateral movement.

Preferably, the beams of the structure are formed by an open I-shaped section member obtained from a single metal sheet bent for forming the section member. The construction is extraordinarily simplified by making this type of section members, thus reducing the costs of the assembly.

In one embodiment, three pairs of carriages that can be moved relative to the corresponding fixed longitudinal beams are provided. Each pair of rails is provided in such a way that the rail of each pair is arranged at a different level in height regarding the adjoining one, the pair of rails in the outer portion of the structure having the shortest height and the pair of rails in the inner portion thereof having the highest height. According to this embodiment, a structure having this configuration allows a pallet to be stored for each pair of rails plus an additional pallet (if any) that would be placed in the last place resting on the rails.

The invention further provides a mechanism that guarantees the locking of the assembly when there is no load on the movable carriages. In this way, each movable carriage is provided, at the end thereof, with a rotatable pawl having a first end projecting upward and which may protrude from the upper portion of the carriage through an opening formed therein. The rotatable pawl has a second, opposed end projecting downward and which may be housed into an opening formed in the corresponding fixed rail. There is also provided a transverse shaft inside the movable carriage passing through the rotatable pawl. The transverse shaft passes through the pawl at a point in the first end thereof nearer than the second end thereof.

According to the previously defined structure of the pawl, when no pallet is present on a pair of movable carriages, the second end of the pawl remains inserted into the opening of the fixed rail due to the own weight of the pawl. Displacement of the carriage regarding the corresponding rail is therefore prevented, locking the assembly when there is no load.

When a pallet rests on the pair of carriages, the pallet is arranged on the first end of the pawl that projects from the upper portion of the carriage through the opening thereof, pushing out the second end of the pawl from the opening of the fixed rail and thus releasing the assembly so that the carriages may be moved.

Preferably, the pawl in each carriage is provided at the initial end thereof through which the pallet are fed into the structure.

Due to the provision of the rotatable pawl mechanism the pairs of movable carriages are only moved when necessary and in a synchronized way, two by two. A maximum optimization in the load and unload process in the storage system is achieved since the proper positioning of the carriages is thus always guaranteed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a frontal elevational view of one level of the structure of the invention;

FIG. 2 is a side elevational view of three structures as that shown in FIG. 1, forming a push back load unit for four pallets;

FIG. 3 is a fully enlarged view of one of the rails of the structure of the invention as seen from an elevational view;

DESCRIPTION OF THE PREFERRED EMBODIMENTS

Figure 4:
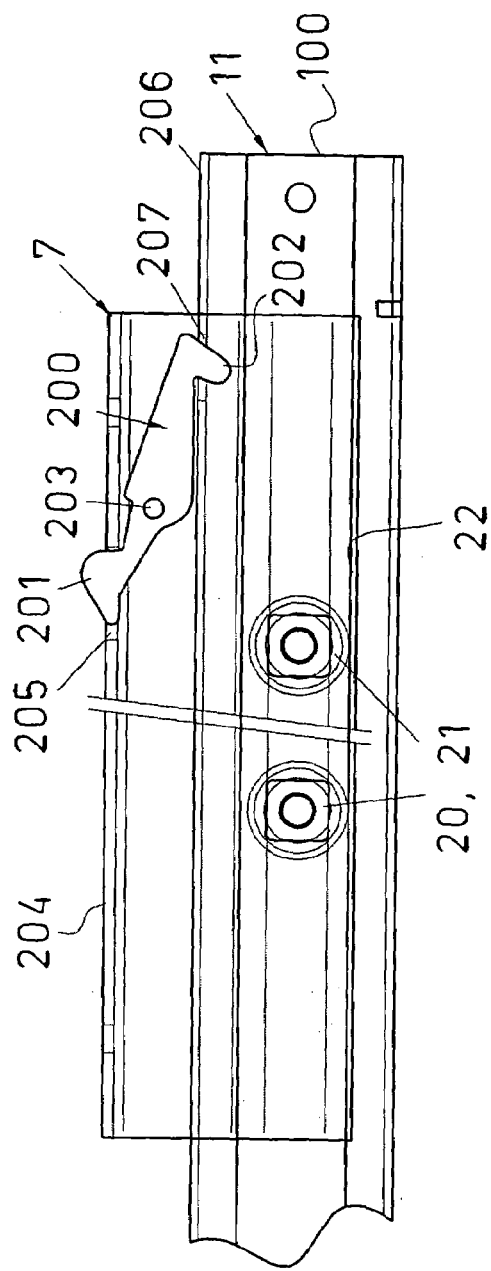
FIG. 4 is a fragmentary elevational view of a movable carriage fitted on the corresponding fixed rail, the movable carriage being provided with a rotatable pawl in a locked position.

A pallet storage system in accordance with the present invention is intended to be used to the variant of the known compact palletisation referred to as push back. The system comprises a set of side members (1), cross members (2) and upright posts (3).

In the figures only one load level has been depicted defined by the plane of the cross members (2), but it will be understood that there may exist as many levels as required by the storage.

The pallets (4, 5, 6) are fed in depth resting on corresponding pairs of movable carriages (7, 8, 9) as shown in the elevational view in FIG. 1. The pairs of movable carriages (7, 8, 9) may be moved in the load and unload direction as shown by the arrow (10) in FIG. 2 relative to longitudinal beams (11) fixedly fitted in the structure and which may be seen in FIG. 1. The longitudinal beams (11) rest by their own weight on the cross members (2) of the structure and their ends are fixed thereto by means of screws or any appropriate means.

As can be seen from the view in FIG. 2, the pairs of movable carriages (7, 8, 9) are provided in such a way that they are slightly inclined lengthwise (of the order of 1°) for promoting unloading operations with a forklift truck.

The movable carriages (7, 8, 9) are formed from a open, substantially reversed U-shaped section member. Each of the wings (12, 13) of the section member has a shaped portion (14, 15) projecting inwardly of the U-shaped section member. A transverse shaft (16, 17) is provided in each shaped portion (14, 15). Each shaft (16, 17) holds, by means of washers (18, 19) fitted therein, respective bearings (20, 21) which may be rotated freely during the rail displacement (7, 8, 9). Therefore, the bearings (20, 21) rest on the lower portion (22) of the web of the beam (11).

In FIG. 3, it may be appreciated how a washer (18, 19) is provided inside the section member and another one in the outer portion thereof to retain the bearings (20, 21) axially. The assembly of the bearings (20, 21) is such that these and the corresponding shaft (16, 17) do not protrude from the entire width of the section member of the rail (7, 8, 9) due to the shaped portions (14, 15) and therefore the distance between the rails (7, 8, 9) is notably decreased. It should be pointed out that, although in the embodiment of the figures axial retention means of the bearings comprising washers (18, 19) fitted in the shafts (16, 17) have been used, other alternative means such as threaded shaft and nut by the outer portion would be also possible.

The open section member of the rails (7, 8, 9) surrounds the longitudinal beam outwardly (11) of the structure and therefore a perfect guiding of the assembly is achieved as well as a remarkable movement accuracy. This is achieved by folding the section member until conferring it a substantially I-shaped section member, as it may be seen from FIG. 3.

The side members (1), cross members (2) and upright posts (3) of the structure of the push back system of the present invention define sets of racks (23, 24, 25) forming inner load passageways with several levels, according to the necessities and the height of the premises. In each level of the structure a product reference may be provided as they are each independent since it is not necessary to drive the forklift truck into the passageways.

The forklift trucks run along the approach passageway perpendicular to the load passageways (not shown). In order to be positioned, the forklift trucks are guided toward the passageway and to the given height required by the product in the pallet (4, 5, 6) to be placed at every time.

In the embodiment shown in the figures, the pallet (4) rests on the pair of rails (9) whereas, in a similar way, the second pallet (5) rests on the intermediate pair of rails (8) and the third pallet (6) do it on the pair of rails (7). A fourth pallet could be placed resting on the rails of the structure.

The longitudinal beams (11) provided on the cross members (2) of the structure are separated according to the width required by each pallet (4, 5,6) for achieving a stable support. The length of each rail (7, 8, 9) running along the corresponding beam (11) is the same as the depth of the pallet (4, 5, 6).

Along each rail (7, 8, 9) there are provided as many bearings (20, 21) as necessary, generally one at each side in the two ends of each rail (7, 8, 9). If more bearings (20, 21) are required depending on the load to be supported, more bearings may be provided, these being perfectly guided in their path.

With a structure as the one herein described it is not necessary the forklift truck to be driven inside the passageway as it is always placed at the beginning of the passageway above its corresponding level.

In use, the operator feeds the first pallet (6) on the pair of the rails (9) as it is at a level slightly higher than the next one, as it can be seen from FIG. 1. The pallet (6) only rests on the pair of rails (9). Once the pallet (6) has been placed, the operator places the second pallet (5) displacing with this the first pallet (6) inward of the structure in the direction of the arrow (10) in FIG. 2 of the drawings. The pallet (6) is moved slightly raised so that it does not touch the parts of the structure due to the level of the rails (9). When the first pallet (6) has been traveled a distance equal to the space that it takes up [which is occupied by the second pallet (5)], it is lowered until resting on the immediately shorter height rails (8). The third pallet (4) is moved and it is positioned in the same way as the second pallet (5) and since the first pallet (6) and the second pallet (5) have been moved inward of the structure, the third pallet (4) is lowered and rests on the pair of shorter height rails (7). As it has been previously noted, a fourth pallet (not shown) may be provided resting on all of the rails (7, 8, 9).

To extract the three pallets (4, 5, 6) shown plus the fourth pallet of the structure, not shown, the operator first extracts the last pallet which was fed, the three remaining pallets (4, 5, 6) being inside the passageway, returning back to the load and unload area (26) moving above the rails (7, 8, 9) due to the longitudinal inclination thereof that makes them to be returned back to the load and unload area (26) of the pallets.

The movable carriages (7, 8, 9) are always braked since the cross member (2) provided at the beginning of the passageway acts as a stop member. When removing the second pallet (4) the process is repeated by lowering other two pallets (5, 6) and so forth. In the loading operation, the movement of the pallets is carried out by pushing inward of the passageway and upwards, while in the unloading operation this is performed outward of the passageway and downwards slipping the pallets by gravity.

Figure 9:
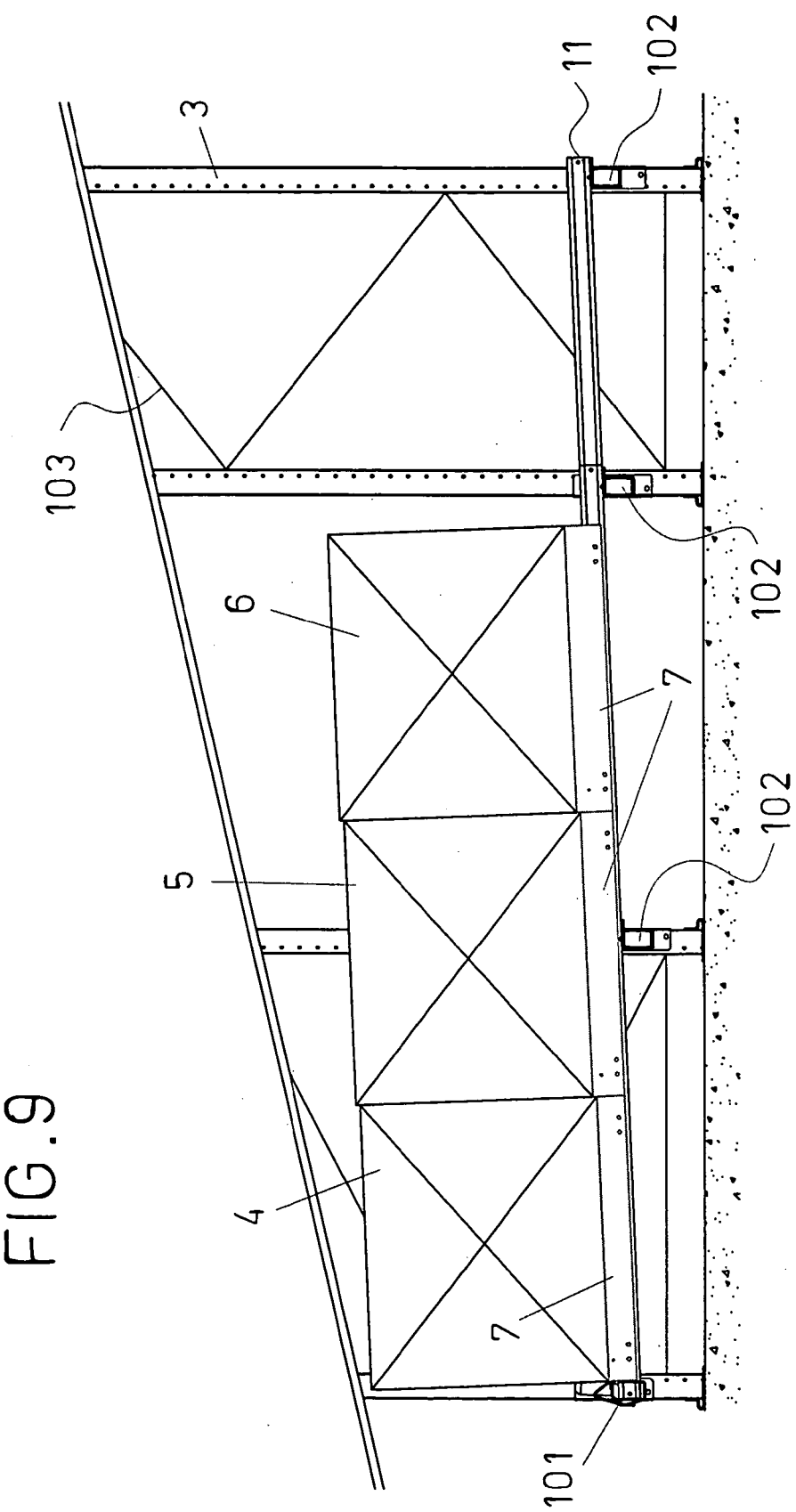
FIG. 9 is a front elevational view of one level of the structure of the invention.

A further embodiment of the invention is now disclosed with reference to FIGS. 4 to 9. In this embodiment, the push back compact palletisation system comprises the already disclosed structure, formed by a frame including upright posts or props (3), an initial side member (101) and intermediate side members (102), as shown in FIG. 9. The frame of the structure is further provided with diagonal members (103).

The loaded pallets (4, 5, 6) are fed in depth supported on pairs of movable carriages (7). The movable carriages (7) may be movable in loading and unloading direction relative to the longitudinal rails (11) fixedly fitted in the structure. The longitudinal rails (11) rest by their own weight on the side members (101, 102) of the structure and their ends are fixed thereto by means of screws or any appropriate means.

As it can be seen from the view in FIG. 9, the rails (11) have a small longitudinal inclination (of the order of 4%) for promoting unloading operations with the forklift truck.

Each of the movable carriages (7) of the structure has, in the initial end (100) thereof, that is, in the end corresponding to the load and unload area, a rotatable pawl (200). The rotatable pawl (200) is a flat metal piece having a first end (201) extending upwards and a second end (202) extending downwards, as it can be seen from FIGS. 4 and 5 of the drawings attached in the present specification.

Figure 6:
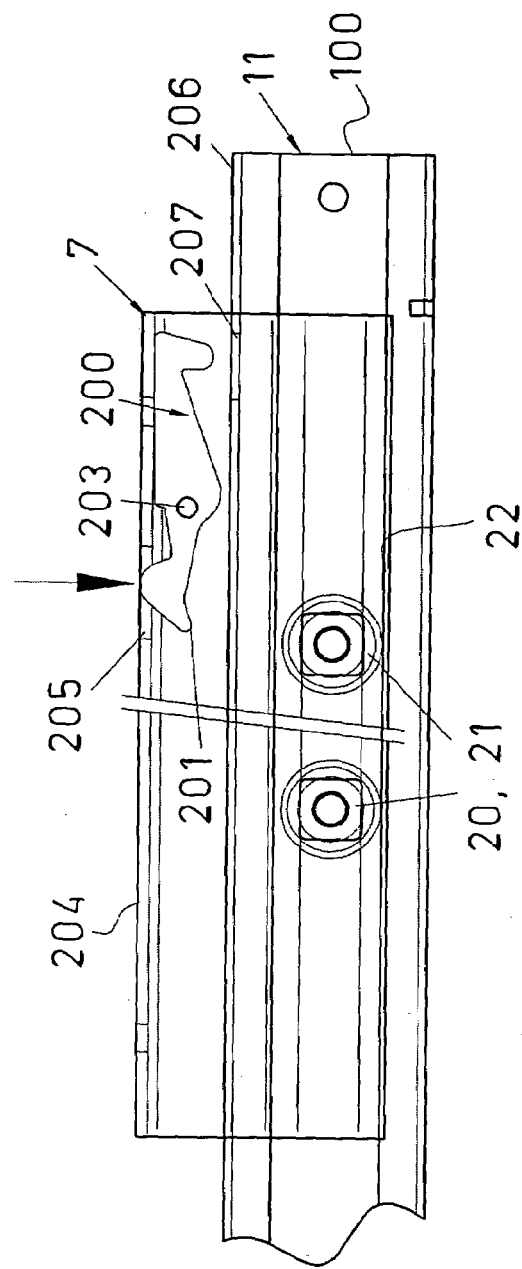
FIG. 6 is a fragmentary elevational view of a movable carriage fitted on the corresponding fixed rail, showing the rotatable pawl in the unlocked position.
Figure 5:
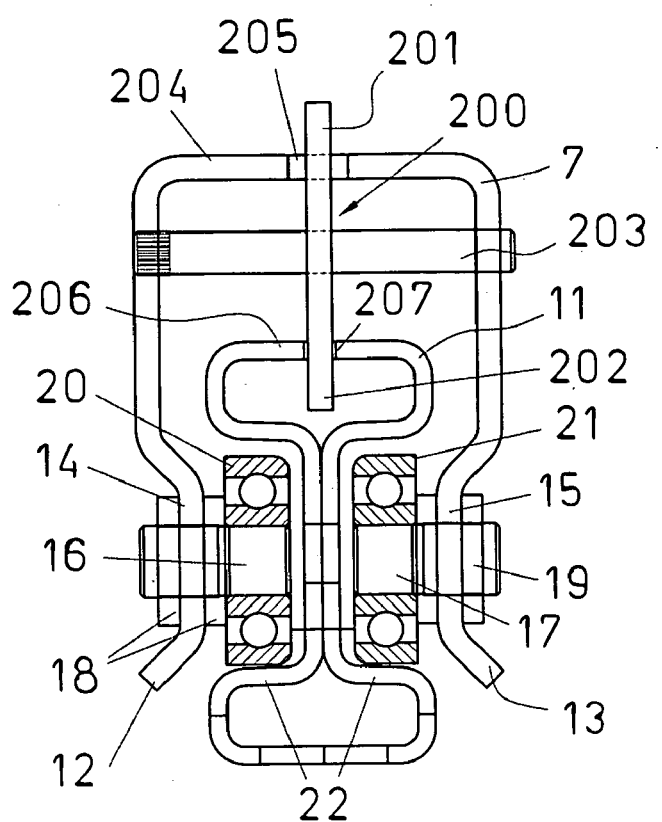
FIG. 5 is a front elevational view of the movable carriage and the fixed rail in FIG. 4 in which the pawl is in the locked position.
Figure 7:
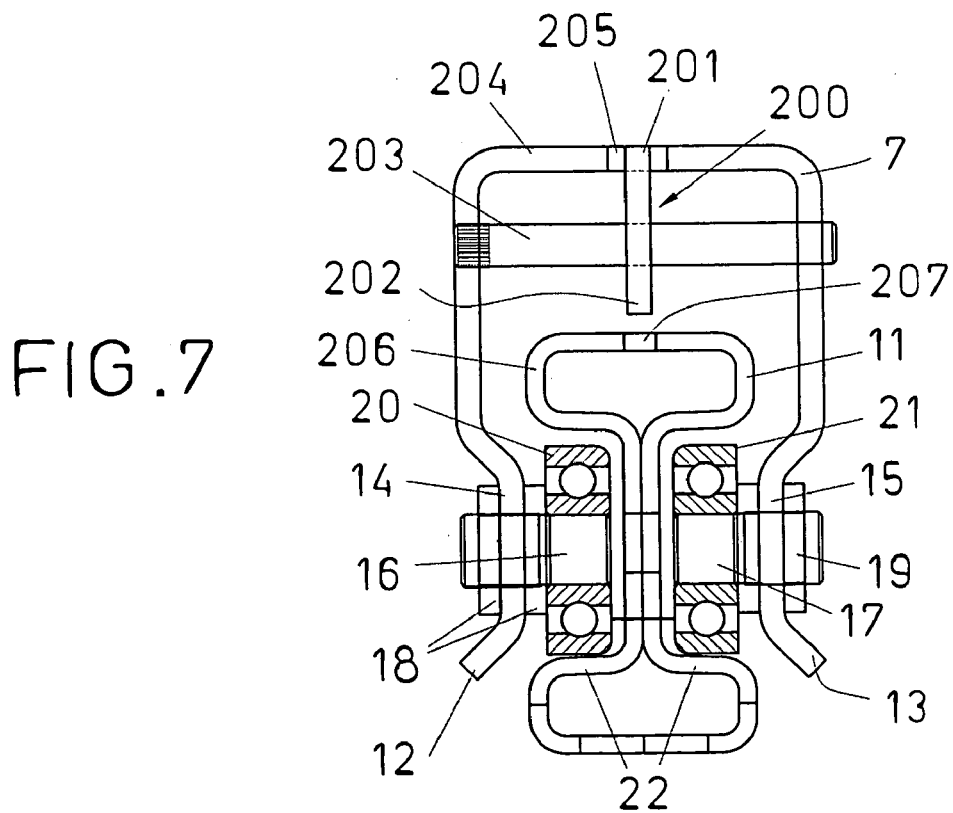
FIG. 7 is a front elevational view of the movable carriage and the fixed rail in FIG. 6 in which the pawl is in the unlocked position.
Figure 8:
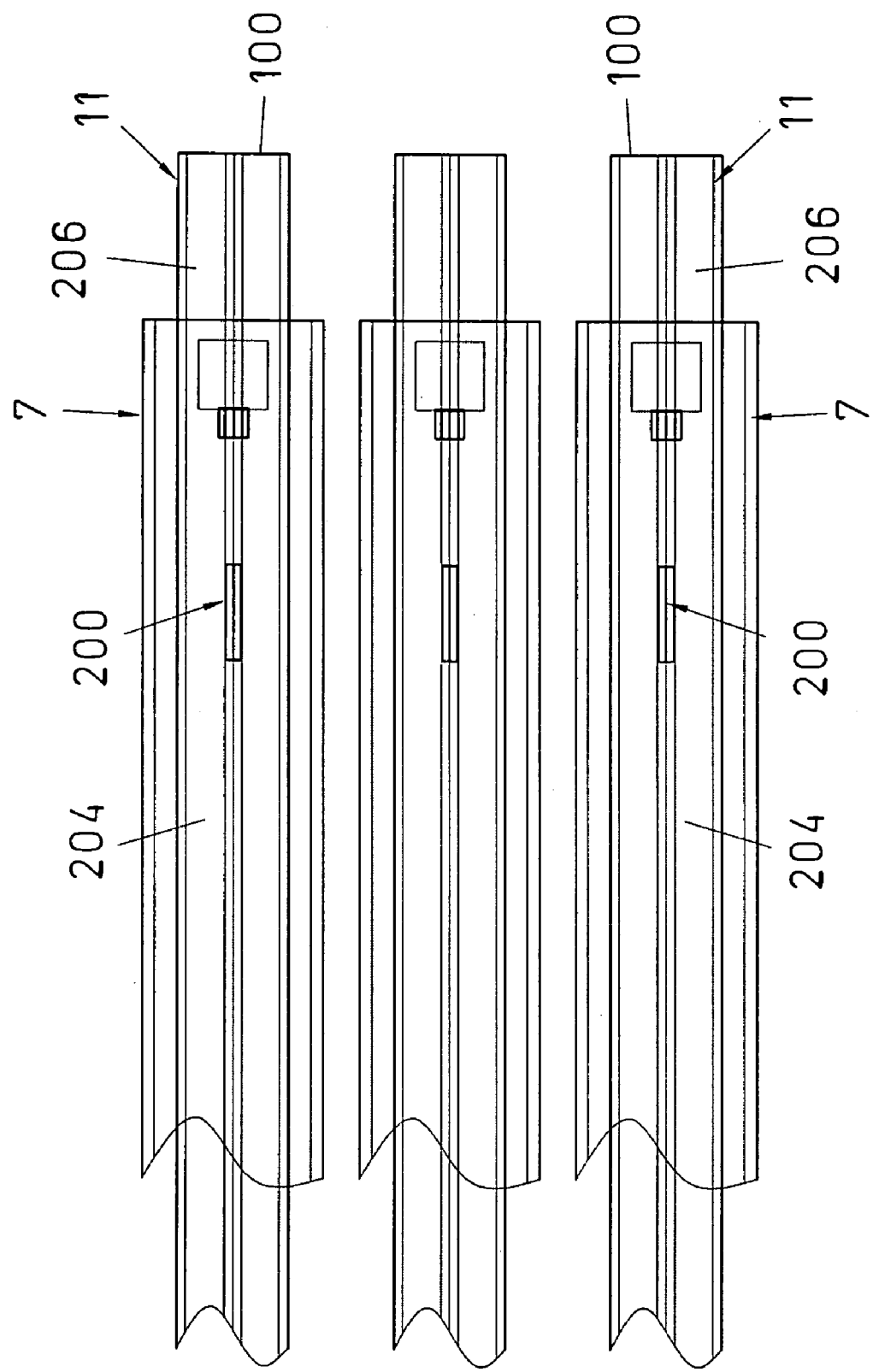
FIG. 8 is a fragmentary plan view showing a movable carriage fitted on the respective fixed rail of the structure of each of the three pairs forming the assembly of the embodiment shown.

The rotatable pawl (200) is rotatably pivoted by means of a transverse shaft (203) placed inside the movable carriage (7), as shown in FIGS. 6 and 7.

In the upper portion (204) of the movable carriage (7) where the load pallet (4, 5, 6) rests an opening (205) is formed wherein the first end (201) of the rotatable pawl (200) projects.

In the head (206) of the fixed rail (11) an opening (207) is provided for receiving the second end (202) of the rotatable pawl (200).

As it can be seen from FIGS. 4 and 7, the transverse shaft (203) passes through the pawl (200) at a point of the first end (201) nearer than the second end (202) of the pawl (200). Therefore, when no pallet (4, 5, 6) is on the upper part (204) of a pair of movable carriages (7), the locked position shown in FIGS. 4 and 5 occurs. In this locked position, the movable carriage (7) can not be moved relative to the fixed rail (11) as the second end (202) of the rotatable pawl (200) remains inserted into the opening (207) of the head (206) of the fixed rail (11) due to the own weight of the part of the pawl (200).

When a pallet (4, 5, 6) is placed on the upper portion (204) of a pair of carriages (7), the lower portion of the pallet (4, 5, 6) rests on the first end (201) of the pawl (200) that projected therefrom through the opening (205). As the pallet (4, 5, 6) rests on the first end (201) of the pawl (200) rotation thereof around the shaft (203) takes place as well as the subsequent releasing of the second end (202) of the opening (207) of the rail (11), so that the carriage (7) may be already moved freely relative to the rail (11).

With this pawl mechanism unwanted advance of the carriages (7) is avoided, thus assuring the locking of the assembly when no load is present on the movable carriages (7).

Therefore, it is started from an unloaded, locked position as shown in FIG. 4 in which the operator may load a first pallet (6) on a pair of carriages (7) located at a slightly upper level than the next one. The pallet (6), resting only on a pair of carriages (7), is placed on the carriage (7) unlocking the assembly according to FIGS. 6 and 7 of the drawings. The operator carries out the same operation with the other pallets, that is, a second pallet (5) is placed moving with this the first pallet (6) inward of the structure as shown in FIG. 9 of the drawings. The pallet (6) is moved slightly raised so that it does not touch the parts of the structure due to the level of the carriages (7). When the first pallet (6) has traveled a distance equal to the space taken up, it is lowered until resting on the immediately shorter height carriages (7). The third pallet (4) is moved and it is positioned in the same way as the second pallet (5) and, as the first pallet (6) and the second pallet (5) have been moved inward of the structure, the third pallet (4) is lowered and rests on the pair of shorter height carriages (7). As it has been previously noted, a fourth pallet (not shown) may be provided resting on all of the rails (11).

To extract the three pallets shown (4, 5, 6) plus a fourth additional pallet, not shown, from the structure, the operator first extracts the last pallet which was fed, the three remaining pallets (4, 5, 6) being inside the passageway, returning back to the load and unload area moving above the rails (11) thanks to the longitudinal inclination thereof that makes them to be returned back to the load and unload area of the pallets.

The movable carriages (7) are always braked since the side member (101) provided in the initial part of the passageway acts as a stop member. When removing the second pallet (4) the process is repeated lowering the other two pallets (5, 6) and so forth. In the loading operation, the movement of the pallets is carried out by pushing inward of the passageway and upward, whereas in the unloading operation it is performed outward of the passageway and downward slipping the pallets by gravity.

It will be understood that each of the elements described above, or two or more together, may also find a useful application in other types of constructions differing from the types described above.

While the invention has been illustrated and described as embodied in push back pallet storage system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A push back pallet storage system, comprising a plurality of side members and cross members arranged in several levels; a plurality of longitudinal I-shaped beams each configured from a single metal sheet and each having an upper flange portion and a lower flange portion connected by a vertical portion; a plurality of carriages for fitting pallets end movable lengthwise relative to said longitudinal beams, each of said movable carriages being formed as a substantially inverted U-shaped carriage provided with wings and surrounding a respective one of said I-shaped beams so that said upper flange portion of each of said I-shaped beams is located in a region of an upper closed portion of each of said carriages and said lower flange portion of each of said I-shaped beams is located in an area of a lower open portion of a respective one of said carriages; and a plurality of bearings running inwardly of a respective one of said inverted U-shaped carriages and on said lower flange portion at both sides of said vertical portion of a respective one of said I-shaped beams.

2. A push back pallet storage system as defined in claim 1, wherein said carriages include three pairs of rails movable relative to said longitudinal beams, each of said pairs of rails being arranged so that a rail of each of said pairs is placed at a level of height different from an adjoining one, wherein a pair of said rails provided in an outer portion of the system has a shortest height and a pair of said rails provided in an inner portion of the system has a greatest height.

3. A push back pallet storage system as defined in claim 1, wherein said carriages include rails, said bearings being fitted on aligned transverse shafts located in shaped portions projecting inwards of each wing of said rails, so that said bearings do not protrude from an entire width of said rails.

4. A push back pallet storage system as defined in claim 1, wherein each of said movable carriages is provided at an end with a rotatable pawl having a first end extending upwards and protrudable from said upper part of said carriage through a first opening and a second opposite end extending downwards and receivable into a second opening formed in said beam: and a shaft extending transversely inside said movable carriage and passing through said pawl at a point of said first end near said second end of said pawl, so that if no pallet is present on a pair of said movable carriages, said second end of said pawl remains inserted into said second opening of said beam by an own weight of said pawl preventing said carriage from being moved relative to a corresponding one of said beams, said carriage being released when a pallet rests on said first end of said pawl protruding from said upper portion of said carriage through said first opening.

5. A push back pallet storage system as defined in claim 4, wherein said pawl is provided at an initial end of each of said carriages where the pallets are fed into the system.

6. A push back pallet storage system, comprising a plurality of side members and cross members arranged in several levels; a plurality of A longitudinal I-shaped beams each configured from a single metal sheet and each having an upper flange portion and a lower flange portion; a plurality of carriages for fitting pallets and movable lengthwise relative to said longitudinal beams, each of said movable carriages being formed as a substantially inverted U-shaped carriage provided with wing; and surrounding a respective one of said I-shaped beams so that said upper flange portion of each of said I-shaped beams is located in a region of an upper closed portion of each of said carriages and said lower flange portion of each of said I-shaped beams is located in an area of a lower open portion of a respective one of said carriages; and a plurality of bearings running inwardly of a respective one of said U-shaped carriages and on said lower flange portion of a respective one of said I-shaped beams, wherein each of said movable carriages is provided at an end with a rotatable pawl having a first end extending upwards and protruding from said upper portion of said carriage through a first opening and a second opposite end extending downwards and receivable into a second opening formed in said beam; and a shaft extending transversely inside said movable carriage and passing through said pawl at a point of said first end near said second end of said pawl so that if no pallet is present on a pair of said movable carriages, said second end of said pawl remains inserted into said second opening of said beam by an own weight of said pawl preventing said carriage from being moved relative to a corresponding one of said beams, said carriage being released when a pallet rests on said first end of said pawl protruding from said upper portion of said carriage through said first opening, wherein said pawl is provided at an initial end of each of said carriages where the pallets are fed into the system.

* * * * *